June 18, 1940.  W. E. STRAUBEL ET AL  2,204,709
PROPORTIONAL PICTURE VARIATOR
Filed March 24, 1938  2 Sheets-Sheet 1

INVENTORS
Walter E. Straubel
BY John P. Eonalf
ATTORNEYS

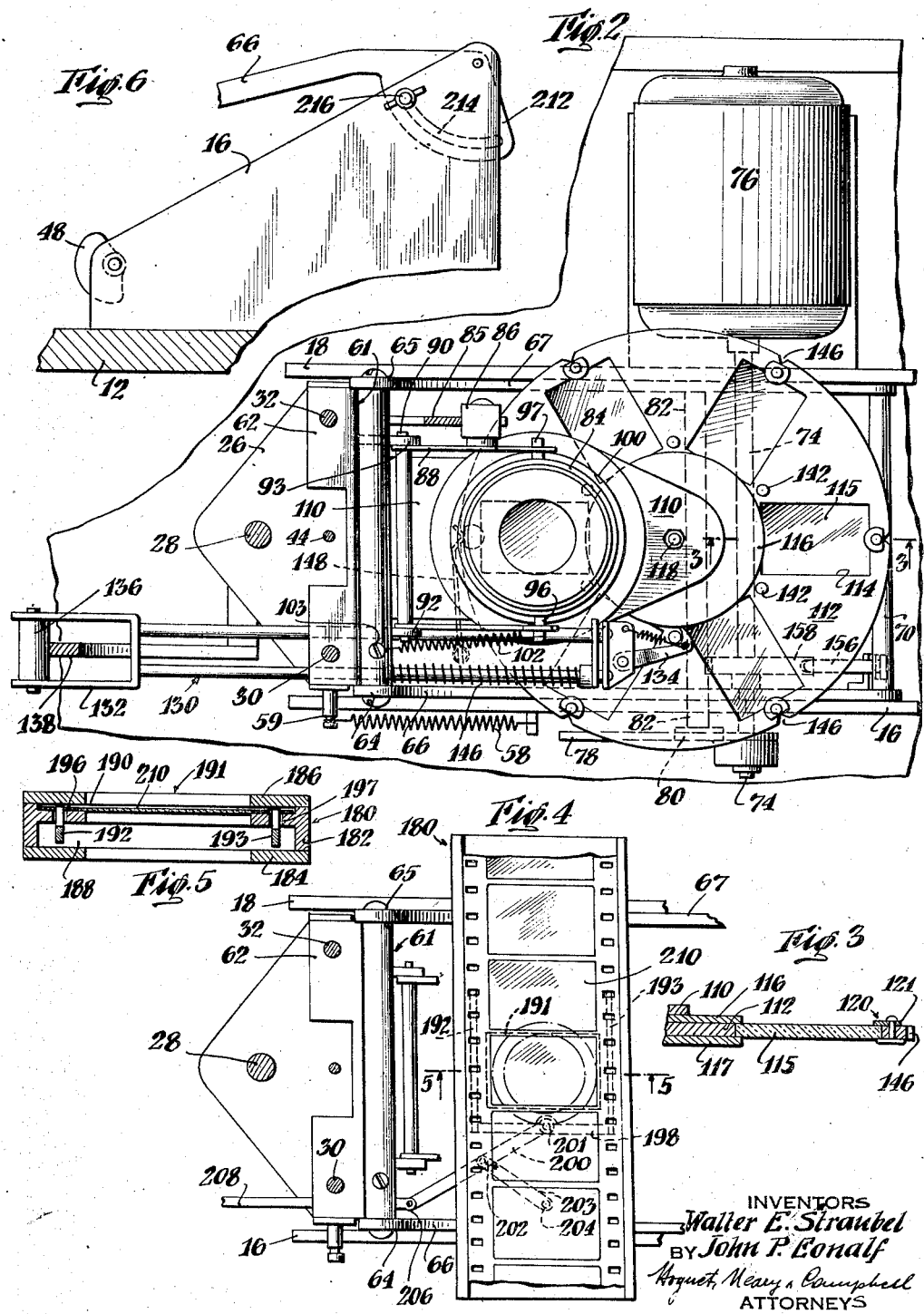

Patented June 18, 1940

2,204,709

UNITED STATES PATENT OFFICE 2,204,709

PROPORTIONAL PICTURE VARIATOR

Walter E. Straubel, North Bergen, and John P. Eonalf, West New York, N. J.

Application March 24, 1938, Serial No. 197,926

2 Claims. (Cl. 88—24)

This invention relates to a projection device adapted to proportionally vary the size of a projected image and method of displaying images of pictures, symbols, and other objects for advertising, amusement, educational or lecture purposes, or for enlarging, printing and other analogous uses.

A display for advertising and like purposes is considerably enhanced where it embodies a sense of movement or change, for it is the movement or change of a displayed image that is certain to catch and arrest the eye of a casual observer. This attention-arresting effect of an image undergoing change may even be intensified if such change produces an effect of movement toward or away from the observer, thereby attracting him in response to his natural impulse to avoid collision with any approaching object; and in the case of a receding object, to the drawing-effect created by the receding movement thereof.

Having in mind this attention-arresting effect of movement toward and away from the casual observer, it is an object of the invention to provide a device adapted to display images of pictures, symbols, and other objects by causing the size of the displayed image to undergo proportional change with the resulting sense-effect of movement toward or away from the observer, as the case may be.

Another object of the invention is to construct a compact device adapted to automatically focus the image of a picture, symbol or other matter upon a screen or the like, and to vary the size thereof while maintaining the image in proper focus.

A further object of the invention is to provide an automatic focusing device adapted to display in a consecutive order images of the subject matter contained in a plurality of lantern slides, or the consecutive frames of movie film.

A still further object of the invention is to produce a new and novel method of displaying pictures, symbols or other objects so as to produce an attention-arresting effect upon the casual observer.

In order to display an image on a screen to produce a sense-effect of movement toward or away from the observer, it is necessary to cause the image to undergo a proportional change in size, and at the same time maintain the image in proper focus. The present invention accomplishes this effect in a compact arrangement of movable parts. A reflector or mirror is mounted for movement toward and away from a screen, and a projector which is directed toward the reflecting surface of the reflector is mounted for movement toward and away from such reflecting surface so that the projected image may be varied in size by the separate movements of the reflector and projector. By combining the movements of both the reflector and the projector the space normally necessary to accomplish the same degree of change is materially reduced. The mechanism which supports and moves the reflector and projector is operatively connected to the objective of the projector so that the objective is automatically adjusted in accordance with the movement of the reflector and projector, thereby maintaining the projected image in proper focus for all positions of the reflector and projector. In the embodiment of the invention adapted to produce a sense-effect of movement toward or away from the observer, the moving parts of the invention are driven through a cycle of movements, such that the projected image is changed in size at a rate suitable to produce the sensation of movement toward or away from an observer as desired, and advantageously further so arranged as to maintain the image in a desirable size for a period of time sufficient for an observer to fully ascertain the contents thereof. This cycle of movements may be repeated for the display of a single picture or object, or for a consecutive series of pictures or objects. Where a single picture or object is to be repeatedly displayed, or a series of pictures or other objects are to be displayed in a consecutive order, the source of light may be de-energized during the phase of the cycle when the image is being changed back to its initial size or when the pictures are interchanged.

For enlarging and printing purposes, a locking device may be provided to retain the movable mechanism in the position where the projected image is of a size desired. While the mechanism is thus retained in one position, an easel provided with sensitized paper may be substituted for the screen and the source of light controlled to perform the necessary exposure.

For a more complete understanding of the invention, reference may be had to the following detailed description and the accompanying drawings, in which:

Figure 2 is a view in plan of the apparatus, taken on line 2—2 of Figure 1 in the position indicated in the broken lines;

Figure 3 is a sectional view taken on line 3—3 of Figure 2 showing details of the lantern slide feeding disc;

Figure 4 is a view in plan similar to Figure 2 of a modified form of the invention with the reflector removed showing a film feeding device with the cover portion thereof removed;

Figure 5 is a sectional view of the film feeding device, taken along line 5—5 of Figure 4; and Figure 6 is a view showing a further form of the invention whereby the projector device may be locked in any desired position.

Figure 1:
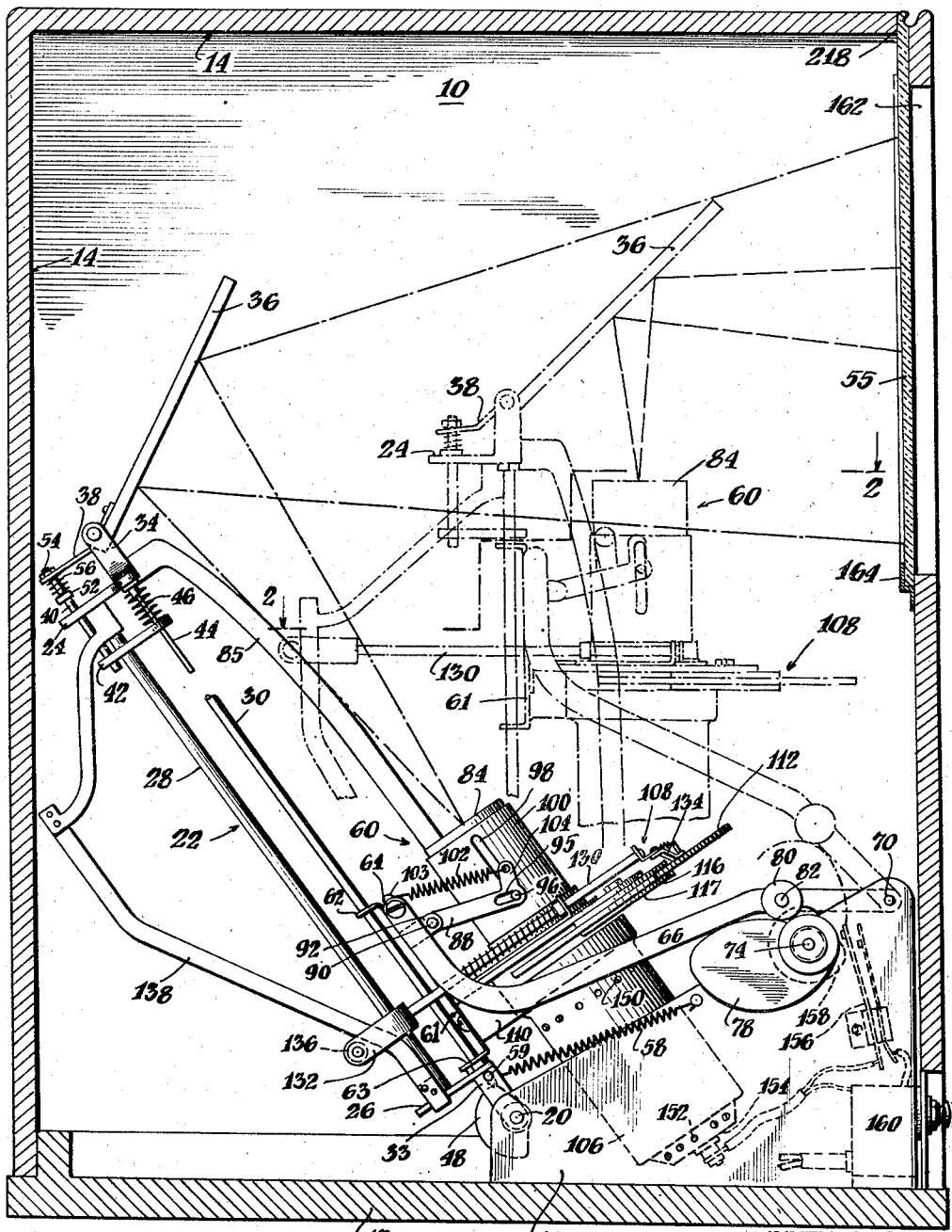
Figure 1 is a view in side elevation of one form of the invention indicating two different operating positions of the focusing mechanism thereof which is also shown as including a lantern slide feeding disc.

In that form of the invention illustrated in Figures 1, 2 and 3, the projection device is enclosed by a housing 10, consisting of a base 12 and a cover portion 14. Appropriately mounted on the base 12 is a pair of spaced, triangular, upright brackets 16 and 18 which support a fixed shaft 20 extending through the lower inner corners thereof. A track assembly 22 comprising triangular upper and lower brackets 24 and 26 which are interconnected by three fixed rods 28, 30 and 32 is pivotally mounted for limited oscillatory movement on the fixed shaft 20 by the apertured portion 33 of the lower bracket 26. The upper bracket 24 pivotally supports a reflector 36, which may be a metallic plate or other reflecting medium, by an apertured portion 34. Extending from one edge of the reflector plate 36 is an apertured arm 38 adapted to engage a rod 40 slidably mounted in the upper bracket 24 and carried by an arm 42 slidably engaged to the rod 28 and secured to a rod 44, slidably mounted in the brackets 24 and 26. A spring 46 interposed between the bracket 24 and arm 42 urges the rod 44 against a fixed cam 48 carried by the shaft 20. The upper portion of the rod 40 is threaded to receive adjustment nuts 52 and 54 which, together with a spring 56, enable the reflector 36 to be readily adjusted with respect to the location of the screen 55.

When the track assembly 22 is oscillated about the shaft 20, the rod 44 is urged to ride on the surface of the cam 48 by the spring 46, causing the reflector 36 to oscillate in proportion to the oscillation of the track assembly 22 so that the reflection of the projected image will be properly centered on the screen 55 for all positions of the track assembly 22. To counterbalance a portion of the weight of the track assembly 22 a spring 58 may be secured thereto as at 59 and anchored to some stationary portion of the device, such as bracket 16.

For the purpose of projecting an image on the reflector 36 during its movement with the track assembly 22, a projector 60 is mounted on a carriage 61 carried by the track assembly 22. The carriage 61 is provided with bearing members 62 and 63 which are slidably supported on track providing rods 30 and 32 for movement toward and away from the reflector 36. Pivotally connected to the carriage 61 at 64 and 65 is a pair of lifting levers 66 and 67, respectively, which are pivotally mounted at their opposite ends to a shaft 70 extending between the upper corners of the brackets 16 and 18. Spaced from the shaft 70 and rotatably mounted in the brackets 16 and 18 is a drive shaft 74 operatively connected to a slow speed motor 76. A driving cam 78 is carried by the drive shaft 74 for engagement with a roller 80 carried by a shaft 82 interconnecting the lifting levers 66 and 67. The shape of the driving cam 78 is such that during clockwise movement it engages the roller 80 to lift the levers 66 and 67, thereby moving the carriage 61 and the track assembly 22 to their upper extreme positions in about one-sixth of a rotation, thereafter allowing them to descend to their lower position in approximately one-third of a rotation, where they remain stationary for approximately one-half of a rotation before they are again raised toward their upper position.

The projection of the image upon the screen 55 is automatically maintained in proper focus during the movements of the reflector 36 and projector 60 by an objective 84 movable relative to the projector 60 and actuated by an elongated cam 85 mounted lengthwise on the track assembly 22. A roller 86 carried by a U-shaped frame 88 pivotally mounted on a shaft 90 passed through bearings 92 and 93 on the carriage 61 coactively engages the elongated cam 85 for automatic adjustment of the objective 84 in accordance with the relative movement of the projector 60 and the reflector 36. The U-shaped frame 88 is provided with elongated slots 95 adapted to engage pins 96 and 97 which extend laterally from the objective 84 through the slot 98 of the projector sleeve 100. A spring 102 is connected to the carriage 61 at 103 and to a lug 104 on the U-shaped frame 88 adjacent the slot 95 to bias the roller 86 against the elongated cam 85. Since the camming surface of the cam 85 extends the entire distance through which the projector 60 travels, the curvature thereof may be easily shaped to obtain a high degree of accuracy in the automatic adjustment of the objective 84 for all positions of the projector 60 and reflector 36.

The projector 60 is shown as including a lamp housing 106 and an automatic lantern slide feeder 108 which are supported on the carriage 61 by a mounting 110, the lantern slide feeder being interposed between the projector sleeve 100 and the lamp housing 106. The lantern slide feeder 108 comprises a large disc 112 containing a plurality of apertures or lantern slide mountings 114, the number of which may be varied as desired, depending, of course, on the size of the disc 112 and the lantern slides 115, which may be made from film as small as 8 mm., from negatives of the candid camera size, or any other convenient size available. Two small circular plates 116, 117 are located, one on each side of the disc 112, as shown in Figure 3, to provide a bearing surface for the disc and also a groove for receiving and retaining the inner edge of the lantern slides 115. The outer edge of each lantern slide is received between the spaced cap portions of a locking device 120, one of which is provided adjacent the outer edge of each lantern slide opening or mounting 114. One of the cap portions of each locking device 120 is trimmed off as at 121 so that when the locking device is revolved to position the trimmed side 121 adjacent the lantern slide opening, the slide may readily be removed and another inserted in its place.

The feeder disc 112 is revolved periodically to exchange the lantern slides within the projector by movement of a reciprocable arm 130 which is provided with a bifurcated element 132 at one end and a spring biased pawl 134 at the opposite end thereof. A roller 136 is rotatably mounted between the arms of the bifurcated element for engagement with a cam-like bracket 138 rigidly secured to the brackets 24 and 26. The arm 130 is biased by a spring 140 to maintain the roller 136 in engagement with the cam 138 during movement of the carriage 61 so that the arm may be reciprocated once for each reciprocation of the carriage. The feeder disc 112 is provided with a plurality of studs 142, one adjacent each lantern slide mounting contained therein, which are adapted to be engaged by the pawl 134 for rotation of the feeder disc through the necessary arc to feed the slides consecutively into the projector during alternate strokes of the arm 130. Notches 146 are provided in the periphery of the disc 112, one for each mounting 114, for releasable engagement with a spring detent 148 adapted to hold the disc during the returning stroke of the arm 130.

It will be apparent from the foregoing that any series of lantern slides contained in the feeder disc 112 may be automatically displayed in consecutive order, and that such series may be repeated, if desired, by continued operation of the device. Additional discs containing various series of slides may be substituted for display purposes from time to time.

The lamp housing 106 may be ventilated by providing it with upper and lower openings 150 and 152. By locating the ventilating openings in the path of movement, the air is caused not only by its natural tendency to move upwardly through the housing when heated but also to move therethrough by the raising and lowering movement of the projector. The lamp housing contains the usual condensers and lamp (not shown), the lamp being held therein by a socket 154. Energization of the lamp is controlled by a switch 156 adapted to be opened and closed by a cam 158 carried by the drive shaft 74. The socket 154 of the lamp housing is connected by appropriate wiring in series with the cam actuated switch 156 and a main switch 160, which may be connected to any available source of electrical power. The motor 76 may also be electrically connected and controlled by the main switch 160.

The screen 55 may be on a support separate from the housing 10 if desired. As illustrated in Figure 1, however, the cover portion 14 of the housing 10 is provided with an aperture 162, about which a channel-providing member 164 is positioned for reception and retention of the screen, which may be of ground glass or other appropriate material.

In summarizing, the device operates as follows: When the main switch 160 is closed and the motor 76 energized, the driving cam 78 is caused to rotate slowly in a clockwise direction. As the steep portion of the driving cam 78 moves under the roller 80, the levers 66 and 67 are caused to rotate clockwise, thereby moving the carriage 61 upwardly on the rods 30 and 32 toward the reflector plate 36. The movement of the carriage 61 operates simultaneously to swing the track assembly 22 forward in a clockwise direction about the shaft 20, carrying the reflector 36 toward the screen 55, the reflector 36 being rotated slightly counterclockwise at the same time by the rod 44 and cam 48 so as to maintain the image properly centered on the screen. The movement of the carriage also provides for the automatic adjustment of the objective 84 by moving the roller 86 over the cam 85. The roller 136 carried by the arm 130 is likewise moved along the cam 138 by the upward movement of the carriage 61, whereby the arm 130 is shifted to the left causing the pawl 134 by engagement with a stud 142 to move the disc 112 clockwise and feed the next succeeding lantern slide into projecting position within the projector 60, the spring detent 148 engaging one of the notches 146 in the periphery of the feeder disc 112 so as to releasably retain the disc in the desired position.

When the projector device reaches its extreme upward position and the reflector 36 is closely adjacent the screen 55, the switch 156 is closed by the cam 158, thereby energizing the lamp contained in the housing 106 to project an image of the slide upon the screen 55. The initial size of the image, however, is quite small, but as the cam 78 continues to revolve and the movement of the carriage is reversed causing it to return toward its lower position and the track 22 to swing counterclockwise, the size of the image is expanded until it reaches a maximum size by the carriage stopping in its lower position. The return movement of the carriage together with the automatic adjustment of the objective 84 causes the image to undergo a proportional change in size while at the same time maintaining its sharpness of focus. Such expansion of the image while its sharpness is maintained produces the sensation of forward movement by the image itself. The maximum size of the projected image is maintained on the screen for a period of time during which the cam 78 makes about one-half of a revolution at the end of which the cam 158 opens the switch 156 and de-energizes the source of light. The mechanism is then ready to start a new cycle whereby another object may be displayed.

The opposite effect may be had by reversing either the cam 78 or the operation of the motor 76, whereby the image would be first displayed upon the screen in its maximum size for a predetermined period of time and thereafter reduced in size to produce a receding effect at the end of the display.

It is understood, however, that the shape of the driving cam may be changed to vary the movement of the carriage and track assembly so as to produce various effects desired and still be within the scope of the invention. For example, the rising and lowering surfaces of the cam may be symmetrical, or they may be increased or decreased in length and/or inclination and the dwell increased or decreased or even eliminated if desired. Thus by suitably shaping the cam 78, the projected image may be caused to undergo an expansion in size during one phase of the cycle and/or reduction in size during another phase of the cycle, whichever effect is desired.

Where it is desirable to use movie film instead of lantern slides, for example, for lectures, home use and enlarging purposes, a modified form of feeding device illustrated in Figures 4 and 5 may be used. The lantern slide feeder 108 is replaced by a film feeder gate 180 which comprises an intermediate element 182 of approximately I-shape in cross-section, a bottom plate 184 and a cover 186, forming longitudinal passages 188 and 190, and an aperture 191 for passage of light. The film is fed through the longitudinal passage 190 by means of a pair of transport pawls 192, 193, which are located in the passage 188 and extend upwardly through slots 196 and 197, respectively, for transporting engagement with the film contained in the passage 190. The pawls 192, 193 are interconnected by a cross piece 198 which is pivotally connected to a link 200 at 201. The link 200 which extends through an opening in the side of the gate 180 is in turn pivotally connected at 202 about midway between its ends to a second link 203, pivotally connected to the bottom cover plate 184 at 204. Pivotally connected to the outer end of the link 200 at 206 is a cam actuated arm 208 which is reciprocated by a suitably shaped cam similar to cam 138.

In operation the pawls 192, 193 are reciprocated longitudinally of the gate 180 by the reciprocation of the connecting arm 208 whereby they are adapted to engage the perforations in the film 210 in one direction of movement so as to move the film one frame for each cycle of operation. The operation of the projection device is otherwise the same as previously described in connection with the lantern slide feeder 108.

Where the automatic focusing feature of the invention is to be used for enlarging and printing purposes, one of the lifting levers 66 or 67 may be provided with an extended sector portion 212, as illustrated in Figure 6, having therein a curved slot 214 for the reception of a locking screw 216 extended through the supporting bracket 16. By this arrangement the projector 60 and reflector 36 may be locked in any desired position to maintain a desired size of an image on the screen 55. The upper wall of the housing 10 is provided with an aperture 218, whereby the screen 55 may be readily removed for the purpose of inserting an easel containing a sensitized paper for making enlargements of the projected image.

From the foregoing description, it will be apparent that we have also invented a new and novel method of displaying images of pictures, symbols and other objects so as to produce an attention-arresting effect upon the casual observer. This new method of displaying images includes the important step of causing a projected image to undergo a proportional change in size while maintaining the image in proper focus. The variation in size may be from small to large or from large to small or both in consecutive order, if desired. The proportional change in the size of an image on display, if properly controlled, produces an effect of motion toward the observer, if the change is that of expansion, and of receding motion if the change is that of reduction. The sense-effect of this change, especially when it first comes into the view of a person, tends to produce alertness, due to his natural reaction to motions of objects directed toward or away from him, whereby he is definitely attracted to the contents of the display. Another step in the method of displaying the image is that of maintaining the image in one size for a predetermined period of time whereby an observer may perceive the contents of the display once he has been attracted by the apparent movement thereof. The image of a picture or object may be displayed in repeated cycles, or images of a series of pictures or objects either related or unrelated may be displayed in consecutive order.

It will be understood that the preceding description is illustrative only and that there can be many variations, both in the elements of the apparatus and in the steps of the method set forth, all falling within the scope of our invention, as defined in the appended claims.

We claim:

1. In a projector device of the character described, a stationary base, an arm pivotally mounted on said base for oscillation toward and away from a screen, a reflector carried by the free end of said arm, means to vary the angular position of said reflector with respect to said arm for different positions of said arm, a projector movably mounted on said arm for projecting an image toward said reflector for reflection upon said screen, a driving element operatively connected to said projector for moving the projector lengthwise of said arm and thereby cause oscillation of said arm, and power means associated with said driving element to operatively control the movements of said projector, arm and reflector.

2. In a projector device of the character described, a stationary base, an arm pivotally mounted on said base for oscillation toward and away from a screen, a reflector pivotally carried by the free end of said arm, a cam surface associated with said base, means operatively connected to said reflector and engageable with said cam surface to vary the angular position of said reflector with respect to said arm for different positions of said arm, a projector, means for mounting said projector for movement lengthwise of said arm, and power means associated with said projector mounting means to move said projector lengthwise of said arm and oscillate said arm in a predetermined relation with respect to the lengthwise movement of said projector.

WALTER E. STRAUBEL.
JOHN P. EONALF.